(12) United States Patent
Quake et al.

(10) Patent No.: US 7,912,675 B2
(45) Date of Patent: *Mar. 22, 2011

(54) METHOD AND APPARATUS FOR ANALYZING STEAM TRAP DATA

(75) Inventors: Tom D Quake, Three Rivers, MI (US); Robert H Kerr, Ann Arbor, MI (US); Rex Cheskaty, Stuart, FL (US); Michael P Helman, Portage, MI (US); Michael H Gaines, Kalamazoo, MI (US)

(73) Assignee: Armstrong International, Inc., Three Rivers, MI (US)

( * ) Notice: Subject to any disclaimer, the term of this patent is extended or adjusted under 35 U.S.C. 154(b) by 41 days.

This patent is subject to a terminal disclaimer.

(21) Appl. No.: 11/792,601

(22) PCT Filed: Dec. 7, 2005

(86) PCT No.: PCT/US2005/044539
§ 371 (c)(1),
(2), (4) Date: Jun. 11, 2008

(87) PCT Pub. No.: WO2006/063196
PCT Pub. Date: Jun. 15, 2006

(65) Prior Publication Data
US 2008/0270047 A1    Oct. 30, 2008

Related U.S. Application Data

(63) Continuation of application No. 11/199,111, filed on Aug. 8, 2005, now Pat. No. 7,203,626, which is a continuation-in-part of application No. 11/006,789, filed on Dec. 8, 2004, now Pat. No. 7,246,036.

(51) Int. Cl.
*G06F 19/00* (2011.01)
*G06F 17/40* (2006.01)

(52) U.S. Cl. ....... 702/182; 73/432.1; 137/551; 340/679; 702/33; 702/187; 702/189

(58) Field of Classification Search ............... 73/710, 73/23.2, 29.01, 432.1, 700, 866; 137/167, 137/154, 156, 159, 165, 168, 171, 551, 558, 137/559; 340/500, 540, 603, 679, 870.01, 340/870.07, 870.16; 702/1, 33, 50, 55, 127, 702/130, 182, 183, 184, 187, 188, 189; 705/1, 705/7, 11, 400, 500
See application file for complete search history.

(56) References Cited

U.S. PATENT DOCUMENTS 1,992,991 A * 3/1935 Colley .......................... 73/223
(Continued)

FOREIGN PATENT DOCUMENTS
EP        0 402 463 A1 * 12/1990
(Continued)

OTHER PUBLICATIONS (May 2005) Accutech, Acoustic Monitor Field Unit User Guide; 31 pages.

(Continued)

*Primary Examiner* — Edward R Cosimano
(74) *Attorney, Agent, or Firm* — MacMillan, Sobanski & Todd, LLC

(57) ABSTRACT

A system for analyzing steam trap data includes a steam trap monitoring device operable to monitor a parameter of a steam trap, transform the parameter into data, and transmit the data to a computer; and includes a computer operable to receive the data, the computer including an algorithm for evaluating the data. A method of analyzing steam trap data includes the steps of: providing a steam trap monitoring device operable to monitor a parameter of a steam trap, transform the parameter into data, and transmit data to a computer, and providing a computer operable to receive the data, the computer including an algorithm for evaluating the data; using the steam trap monitoring device to monitor a parameter of a steam trap, transform the parameter into data, and transmit the data to the computer; and using the computer to receive the data, and evaluate the data with the algorithm.

30 Claims, 4 Drawing Sheets

U.S. PATENT DOCUMENTS

| | | | | |
|---|---|---|---|---|
| 2,883,255 | A * | 4/1959 | Anderson | 346/34 |
| 3,491,585 | A * | 1/1970 | Hass | 73/64.44 |
| 4,508,135 | A * | 4/1985 | Schlesch et al. | 137/185 |
| 4,630,633 | A | 12/1986 | Vallery | |
| 4,705,212 | A * | 11/1987 | Miller et al. | 236/54 |
| 4,788,849 | A * | 12/1988 | Yonemura et al. | 73/40.5 A |
| 4,898,022 | A * | 2/1990 | Yumoto et al. | 73/46 |
| 4,909,067 | A * | 3/1990 | Hayes | 73/29.01 |
| 5,065,785 | A | 11/1991 | Deacon et al. | |
| 5,715,177 | A * | 2/1998 | Machida et al. | 702/62 |
| 5,947,145 | A * | 9/1999 | Schlesch et al. | 137/182 |
| 5,992,436 | A | 11/1999 | Hellman et al. | |
| 6,145,529 | A | 11/2000 | Hellman et al. | |
| 6,216,539 | B1 * | 4/2001 | Johnson et al. | 73/592 |
| 6,332,112 | B1 * | 12/2001 | Shukunami et al. | 702/56 |
| 6,424,930 | B1 * | 7/2002 | Wood | 702/184 |
| 6,485,537 | B2 * | 11/2002 | Brilmaker | 55/463 |
| 6,581,045 | B1 * | 6/2003 | Watson | 705/400 |
| 6,675,665 | B2 * | 1/2004 | Blazquez Navarro et al. | 73/865.8 |
| 6,728,659 | B1 * | 4/2004 | Nguyen et al. | 702/182 |
| 6,772,093 | B2 * | 8/2004 | Nguyen et al. | 702/182 |
| 6,850,848 | B2 * | 2/2005 | Nguyen et al. | 702/34 |
| 6,880,128 | B2 * | 4/2005 | Nguyen | 715/744 |
| 7,130,804 | B2 * | 10/2006 | Fujiwara | 705/305 |
| 7,203,626 | B2 * | 4/2007 | Quake et al. | 702/189 |
| 7,246,036 | B2 * | 7/2007 | Cheskaty et al. | 702/183 |
| 7,664,610 | B2 * | 2/2010 | Anderson et al. | 702/51 |
| 7,698,102 | B2 * | 4/2010 | Fujiwara | 702/183 |
| 7,702,484 | B2 * | 4/2010 | Armstrong et al. | 702/183 |
| 2001/0002460 | A1 * | 5/2001 | Nguyen et al. | 702/35 |
| 2001/0005819 | A1 * | 6/2001 | Nguyen et al. | 702/182 |
| 2001/0007093 | A1 * | 7/2001 | Nguyen | 702/182 |
| 2002/0026343 | A1 * | 2/2002 | Duenke | 705/8 |
| 2002/0052716 | A1 * | 5/2002 | Fujiwara | 702/184 |
| 2002/0124666 | A1 * | 9/2002 | Navarro et al. | 73/865.8 |
| 2006/0118647 | A1 | 6/2006 | Cheskaty et al. | |
| 2006/0118648 | A1 | 6/2006 | Armstrong et al. | |
| 2006/0122808 | A1 * | 6/2006 | Quake et al. | 702/183 |
| 2007/0057802 | A1 * | 3/2007 | Fujiwara | 340/605 |
| 2007/0073495 | A1 * | 3/2007 | Anderson et al. | 702/50 |
| 2008/0249744 | A1 * | 10/2008 | Fujiwara | 702/183 |
| 2009/0044042 | A1 * | 2/2009 | Fujiwara et al. | 714/3 |
| 2009/0216495 | A1 * | 8/2009 | Fujiwara et al. | 702/184 |
| 2009/0228121 | A1 * | 9/2009 | Fujiwara et al. | 700/81 |
| 2009/0299676 | A1 * | 12/2009 | Fujiwara | 702/114 |
| 2010/0153068 | A1 * | 6/2010 | Armstrong et al. | 702/183 |

FOREIGN PATENT DOCUMENTS

| | | |
|---|---|---|
| GB | 2 189 321 | 10/1987 |
| WO | WO 99/39129 A1 * | 8/1999 |
| WO | WO 2006/063197 A2 * | 6/2006 |

OTHER PUBLICATIONS (Jun. 2004) Accutech, Base Radio User Manual; 29 pages.

(Apr. 2005) Accutech, Wireless Instrumentation Manager User Guide; 34 pages.

(Jul. 25, 2001) SmartWatch Continuous Leak Detection System; 13 pages.

(1999) spirax sarco Spiratec R16C Automatic Steam Trap Monitor Operators Instructions, IM-P087-22 MI Issue 4; 8 pages.

(2004) spirax sarco Spiratec R16C Automatic Steam Trap Monitor, TI-P087-20 MI Issue 4; 2 pages.

(2004) spirax sarco Spiratec R16C Automatic Steam Trap Monitor Installation, Commissioning and Fault Finding Instructions, IM-P087-21 MI Issue 7; 24 pages.

(Apr. 2003) TrapMan Model TW5/TrapManager, Computerized Steam Trap Management System for Productive Maintenance; 2 pages.

(2000) Yarway, installation, operation and maintenance Yarway SmarTrap Electronic Monitor for the series 711/721/701-F2 disc trap (standard, HP, HC, & XHC).

PCT Search Report for International Application No. PCT/US05/44539.

* cited by examiner

METHOD AND APPARATUS FOR ANALYZING STEAM TRAP DATA

CROSS-REFERENCE TO RELATED APPLICATIONS

This application is a national stage of International Application No. PCT/US05/044539, which claims priority to U. S. patent application Ser. No. 11/199,111, filed Aug. 8, 2005, now U.S. Pat. No. 7,203,626, which is a Continuation-In-Part of U. S. patent application Ser. No. 11/006,789, filed Dec. 8, 2004, now U.S. Pat. No. 7,246,036. the disclosures of which are all incorporated herein by reference.

BACKGROUND OF THE INVENTION

1. Field of the Invention

This invention relates in general to steam traps and the monitoring of steam traps.

2. Description of Related Art

Steam traps are equipment items common in factories, refineries and other industrial or commercial facilities that use steam line systems. Steam traps are installed in process steam lines and act to separate condensed steam, or "condensate," from the steam without allowing the steam to escape from the steam line system. The separated condensate is then typically recycled through condensate return lines to a boiler for conversion back to steam. During ideal operation, a steam trap removes condensate from process steam lines while preventing steam from escaping past the steam trap into the condensate return lines. If steam is allowed to pass through the steam trap into the condensate return lines, the result is a loss of valuable energy and a reduction in the efficiency of the steam line system. Further, if the steam trap is not removing condensate from the steam line system, and the condensate is allowed to remain in the steam lines, the result is a reduction in the efficiency of the steam system and an increase in the needed energy to maintain the same operations.

There are several well-known types of steam traps, including inverted bucket traps, float traps, thermostatic traps, and disc traps. Manufacturing facilities, refineries, and large buildings often are fitted with extensive systems of steam lines for heating and for process steam. Some of these facilities typically contain 1,000 or more steam traps. To promote efficient operation of the steam traps, some type of monitoring or inspection is often employed to detect malfunctioning traps, which may then be replaced or repaired.

Several different methods of monitoring the condition of a steam trap are known. One method uses a system with a battery powered probe to sense the temperature of a trap. The temperature measurement is then correlated with a particular condition of the steam trap. Another method uses a system with a battery powered probe in an inverted bucket steam trap to sense the presence of water in the trap. When the inverted bucket steam trap has water in it, the trap has a state or condition referred to as "prime." A properly operating inverted bucket trap must have a condition of prime if it is functioning properly. A requisite amount of water in the trap is indicative of proper steam trap operation. Such a steam trap monitoring system includes a probe extending into a steam trap, the probe being responsive to the level of condensate in the steam trap.

Another method of monitoring a steam trap uses a steam trap system including signal lights on the steam trap indicative of the process conditions in the trap. For proper monitoring, such a system requires visual inspection of the steam trap.

Another method to monitor a steam trap uses a hard wired system, which includes physical wiring that is threaded from a steam trap to a centrally located steam trap control station for receiving and storing data concerning the process conditions of the steam trap.

Still other methods for monitoring steam traps use systems suitable to transmit and report steam trap status data using radio wave signals.

BRIEF SUMMARY OF THE INVENTION

This invention relates in general steam traps and the monitoring of steam traps and more specifically to a method of analyzing steam trap data and a system for analyzing steam trap data.

The system for analyzing steam trap data includes a steam trap monitoring device operable to monitor a parameter of a steam trap, transform the parameter into data, and transmit the data to a computer. The system includes a computer operable to receive the data, the computer including an algorithm for evaluating the data.

The method of analyzing steam trap data includes the steps of: providing a steam trap monitoring device operable to monitor a parameter of a steam trap, transform the parameter into data, and transmit data to a computer, and providing a computer operable to receive the data, the computer including an algorithm for evaluating the data; using the steam trap monitoring device to monitor a parameter of a steam trap, transform the parameter into data, and transmit the data to the computer; and using the computer to receive the data, and evaluate the data with the algorithm.

Various objects and advantages of this invention will become apparent to those skilled in the art from the following detailed description, when read in light of the accompanying drawings.

DETAILED DESCRIPTION OF THE INVENTION

Figure 1:
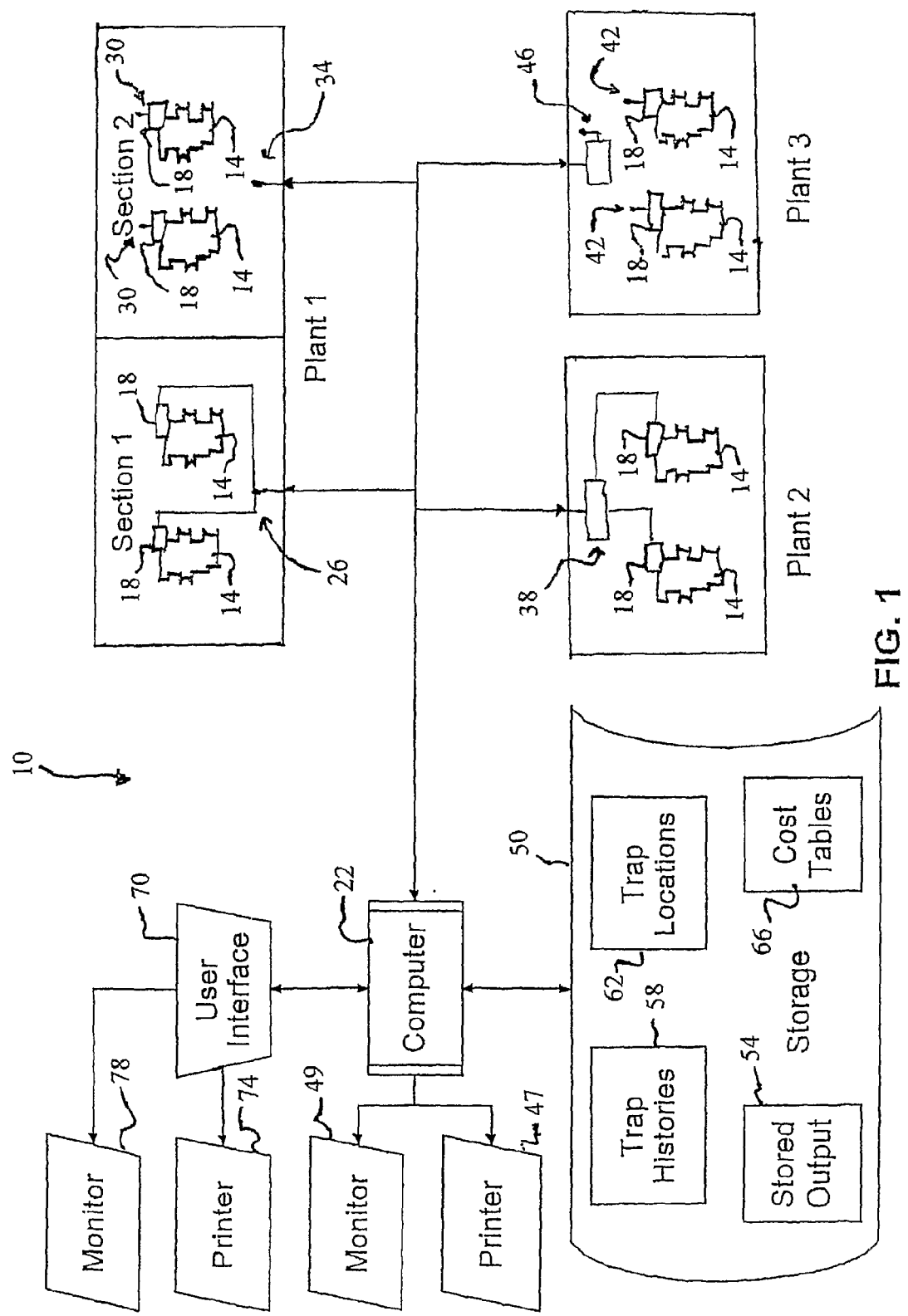
FIG. 1 is a schematic view of a system for analyzing steam trap data in accordance with the present invention.

Referring now to the drawings, there is illustrated in FIG. 1 a system, indicated generally at 10, for analyzing steam trap data in accordance with the present invention. The system 10 includes a plurality of steam traps 14. As shown in FIG. 1 the steam traps 14 are located within multiple facilities, i.e., Plant 1, Plant 2, and Plant 3. Within Plant 1, the steam traps 14 are located within multiple portions of the facility, i.e., Sections 1 and 2 of Plant 1. It must be understood however that the system 10 may include any suitable number of steam traps 14 at any suitable number of locations. For example, the system 10 may include a single steam trap 14 in a single portion of a single facility, or any other number of steam traps in any number of portions of any number of facilities.

Each steam trap 14 is provided with a steam trap monitoring device 18. Each monitoring device is operable to monitor an operating parameter of a respective steam trap 14, transform the parameter into data, and transmit the data. The monitored parameter may include temperature, pressure, condensate flow rate, steam flow rate, fluid levels, or any other suitable parameter. The monitoring device 18 is shown as an integrated device with a sensor for monitoring a parameter, a transforming apparatus, such as a microprocessor, for transforming the parameter into data, and a transmitter for transmitting the data. The monitoring device 18 is shown as coupled to, or in direct contact with, the steam trap 14. It must be understood, however, that the monitoring device 18 may be any suitable device operating in any suitable manner. For example, the monitoring device 18 may be several separate modules including any suitable sensor, any suitable transforming apparatus, and any suitable transmitter. The sensor may be a direct sensor, such as a thermocouple or any suitable direct sensor, or an indirect sensor, such as an infrared scanner or any suitable indirect sensor. Also, the monitoring device 18 may be connected to equipment near the steam trap 14 instead of actually on the steam trap 14.

Figure 4:
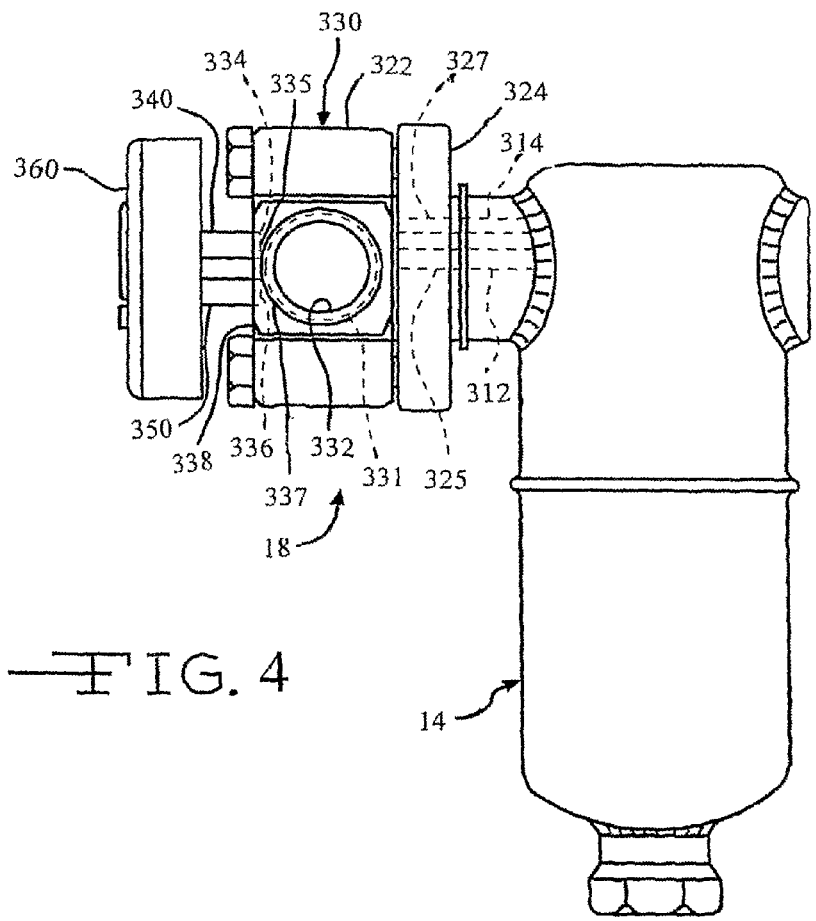
FIG. 4 is a schematic illustration, partially in phantom, of a steam trap and a remote monitoring system, suitable for use in the system of FIG. 1.

There is shown in FIG. 4 a more detailed illustration of the steam trap 14 and the monitoring device 18, suitable for use in the system of FIG. 1.

The depicted steam trap 14 is generally conventional and well known in the art, although it is to be understood that the present invention may be used with other types of steam traps. The steam trap 14 is connected to a live steam line (not shown) which supplies steam into the steam trap 14. The steam trap 14 is also connected to a condensate return line (not shown) to direct the condensate back to the steam generator, such as a boiler (not shown). The steam trap 14 is connected to the monitoring device 18.

In the embodiment shown, the monitoring device 18 includes a connector block 330, a temperature sensor device 340, an acoustic sensor device 350, and an electronic monitoring device 360.

The connector block 330 allows the steam trap 14 to be installed in a piping configuration. The connector block 330 can be manufactured out of any suitable material that can withstand normal steam trap working pressures and temperatures. In certain embodiments, the connector block 330 is made of stainless steel. It is to be understood that suitable piping connections for the connector block 330 can be NPT, PSPT, socket weld, butt weld, or any specialty connection that is acceptably used in the steam trap industry. In certain embodiments, the connector block 330 can have a strainer (not shown) for debris removal.

The connector block 330 is operatively connected to the steam trap 14 in a suitable manner as will be understood by those skilled in the art. In the embodiment shown, the connector block 330 includes a coupling 322 secured to a collar 324. The coupling 322 and collar 324 are in generally coaxial alignment with one of an inlet port 312 and an outlet port 314 in the steam trap 14, as in a manner understood by those skilled in the art. The collar 324 includes at least one steam inlet passage 325 and at least one steam outlet passage 327.

The coupling 322 of the connector block 330 includes at least one steam inlet passage 331 that receives steam from the upstream steam system. The steam inlet passage 331 is in communication with the inlet passage 325 in the collar 324, which, in turn, is in communication with the inlet port 312 in the steam trap 14. The coupling 322 in the connector block 330 also includes at least one steam outlet passage 332 that receives recovered steam from the steam outlet passage 327 in the collar 322 of the steam trap 14 and delivers the recovered steam to the downstream steam system. As is well understood, a portion of the supply of steam is diverted into the steam trap 14 where condensate is trapped or retained and then removed from the steam system.

Figure 5:
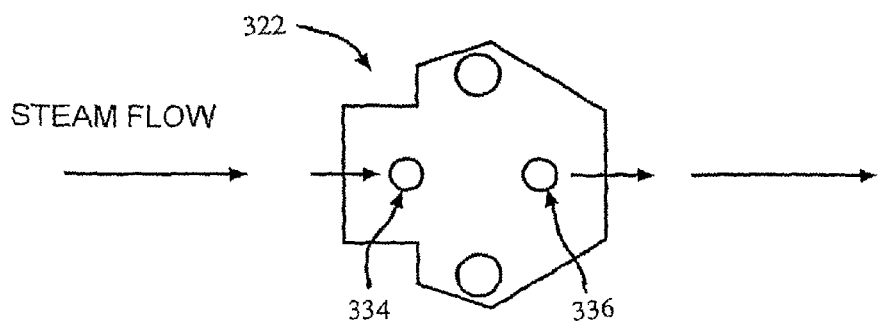
FIG. 5 is a schematic illustration showing openings for probes in a coupling of a connector block of the remote monitoring system of FIG. 4.

In one aspect of the present invention, the connector block 330 defines a first orifice, or pocket, 334 and a second orifice, or pocket, 336, as shown in FIG. 5. The first and second pockets 334 and 336 each extend inward from an outer surface 338 of the connector block 330. The first and second pockets 334 and 336 terminate at closed ends 335 and 337, respectively. The closed ends 335 and 337 are in a spaced apart relationship to the inlet and outlet passages 331 and 332 in the connector block 330.

The first pocket 334 has an interior dimension that readily accepts the temperature sensor device 340. The temperature sensor 340 is located within the connector block 330 in the first pocket 334 near the inlet port 331 in the connector block 330. The temperature sensor device 340 monitors the temperature of the steam entering the steam trap 14.

The second pocket 336 has an interior dimension that readily accepts the acoustic sensor device 350. The acoustical sensor device 350 is located within the connector block 330 in the second pocket 336 in a suitable manner. The acoustical sensor device 350 monitors sound emitting from the steam trap during the service life of the steam trap 14.

The electronic monitoring device 360 is operatively connected to the temperature sensor device 340 and to the acoustical sensor device 350. The electronic monitoring device 360 receives data from the temperature sensor device 340 and the acoustic sensor device 350 and provides the monitoring logic for the individual trap 14 to which the monitoring device 360 is connected.

The electronic monitoring device 360 can include any suitable enclosure for encasing the sensing equipment required for operation of the monitoring device 18. The electronic monitoring device 360 includes any suitable programmable device capable of controlling the gathering, storage, and dissemination of process condition data. In certain embodiments, a suitable sensor controller is a PIC 16C322 chip from Microchip. It is to be understood that various input devices can be connected to the sensor controller to supply the sensor controller with data from the temperature sensor device 340 and from the acoustic sensor device 350. For example, electrodes (not shown) can be connected via lead lines (not shown) from the electronic monitoring device 360 to the temperature sensor device 340 and to acoustic sensor device 350 to provide input regarding the prime status (prime or no prime) of the steam trap 14. The electronic monitoring device 360 can be programmed to set a desired level for acceptable temperature and acoustical sensitivity.

Referring again to FIG. 1, the system 10 includes a computer 22. The computer is operable to receive the data from the steam trap monitoring devices 18. For example, the monitoring devices 18 in Section 1 of Plant 1 are directly hard wired to the computer 22, as indicated at 26. The monitoring devices 18 in Section 2 of Plant 1 are equipped with wireless transmitters, as indicated at 30, and the computer 22 is directly connected with a wireless receiver, as indicated at 34, to receive the data from the monitoring devices 18 in Section 2. In the present example, the computer 22 may be located in or near Plant 1, i.e., at the same facility, for efficiency of wiring. However, it must be understood that the computer 22 may be in any suitable location.

In another example, the monitoring devices 18 may include internet enabled transmitters. In this situation, all or some of the monitoring devices 18 in Plant 1 would be operable to transmit data to the computer 22 over the internet.

As used in this description, the term "internet enabled" is intended to include, but not be limited to, any device that can function to send or receive data over the internet, such as, for example, by having a transceiving device assigned a static IP address, or in any other suitable manner. Also, as used in this description, the term "transmitter" is intended to include, but not be limited to, any device that suitable to broadcast data, either over hard wired lines or wirelessly, and the term "receiver" is intended to include, but not be limited to, any device suitable to receive data, either over hard wired lines or wirelessly. The term "transceiver" is intended to include, but not be limited to, any device capable of performing as both a transmitter and a receiver. Further, it must be understood any device referred to as a "transmitter" or a "receiver" may be a "transceiver." Additionally, it is intended that any of these devices may be integral to or separate from but connected to any of the other devices with which they are described as functioning.

For further example, the monitoring devices 18 of Plant 2 are wired to a repeater 38. In the present example, the computer 22 is located remotely from Plant 2, i.e., at a different facility, and the repeater 38 may be an internet enabled transceiver, such as a router, or any other suitable transceiver. In another example, when the computer 22 is located within the Plant 2 the repeater 38 may by an intranet enabled transceiver, such as a hub, bridge, or switch, or any other suitable transceiver.

The monitoring devices 18 of Plant 3 are equipped with wireless transmitters, as indicated at 42. The wireless transmitters 42 are in communication with a wireless repeater 46. In the present example, the computer 22 is located remotely from Plant 3, and the wireless repeater 46 may be an internet enabled transceiver, such as a router, or any other suitable transceiver. In another example, when the computer 22 is located within the Plant 3 the wireless repeater 46 may be an intranet enabled transceiver, such as a hub, bridge, or switch, or any other suitable transceiver.

It must be understood, however, in either example for Plant 2 or Plant 3, that the repeater 38 or the wireless repeater 46 may be any suitable repeater, such as, for example, any transceiver operable to relay the data from a steam trap monitoring device 18 to the computer 22, or any other suitable repeater.

The computer 22 includes an algorithm for evaluating the data. The algorithm is suitable to provide an analysis of the data. As used in this description, the term "algorithm" is intended to include, but not be limited to, any program capable of making a substantive analysis of the data. The algorithm may include at least one program module. As used in this description, the term "program module" is indented to include, but not be limited to, any portion of a program, or sub-program, which is designed to make a specific analysis of data. For example, the algorithm may include:

an economic program module (e.g., cost analysis of steam trap operation);

an environmental program module (e.g., environmental impact of steam trap operation);

an operational program module (e.g., functional report of steam trap operation and/or related systems);

a predictive program module (e.g., prediction of future steam trap operation/failure/repair);

a remedial program module (e.g., repair work order and/or parts order, generation of repair schedule); or any other suitable program module.

The system 10 may also include at least one output device, such as a printer 47 or a monitor 49, in communication with the computer 22. The output device, such as a printer 47 or a monitor 49, is operable to present output from the computer 22 to a user, such as by print-out or by display, where the output is based upon the algorithm evaluation of the data.

The system 10 further includes an optional storage device 50 in communication with the computer 22. As shown in FIG. 1, the storage device 50 is separate from the computer 22 and may be any suitable storage device, such as a network server, or internet sever. Further, it must be understood that the storage device 50 may be integral to the computer 22, such as a fixed disk drive, tape drive, dvd/cd rw, or any other suitable storage device. The storage device 50 is operable to store output from the computer 22, the output being based upon the algorithm evaluation of the data, as indicated at 54. The storage device 50 may include information that may be used by the computer 22 during the algorithm evaluation of the data. Such information could include the function history of one or more steam traps 14, as indicated at 58, the location of one or more steam traps 14, as indicated at 62, the cost of use/parts/repair of one or more steam trap 14, as indicated at 66, or any other suitable information.

The system 10 optionally also includes a user interface 70. As shown in FIG. 1 the user interface 70 is a second computer, such as a single user workstation, or any other suitable computer. It must be understood, however, that the user interface 70 may be a personal data assistant, mobile phone, or any other suitable interface. Further, the user interface 70 is shown as being connected to the computer 22 by a hard wire internet connection, with the user interface 70 being remotely located from the computer 22. It must be understood, however, that the user interface 70 and the computer 22 may connected in any suitable manner, such as by wired or wireless intra or internet. It also must be understood, that while the computer 22 and the user interface 70 are illustrated as two separate devices, the computer 22 and the user interface 70 may be integrated into a single unit.

The user interface 70 is suitable to receive output from the computer 22, the output being based upon the algorithm evaluation of the data. Further, the computer 22 and user interface 70 may be connected such that at least one program module may be executed upon the computer's receiving an execution request from the user interface 70. Also, the computer 22 can be configured such that the computer 22 will automatically execute at least one program module upon reception of the data from the steam trap monitoring device 18.

The user interface 70 may be in communication with at least one output device, such as a printer 74 or a monitor 78. The output device, such as the printer 74 or the monitor 78, is operable to present output from user interface 70, the output being based upon the algorithm evaluation of the data, to a user, such as by print-out or by display.

Further, the system 10 may be configured such that the computer 22 may store output to the storage device 50 and may retrieve the stored output for transmission to the user interface 70. Additionally, the computer 22 may be set up so that it transmits output to the user interface 70 automatically after analyzing the data from the monitoring device 18. Alternatively, the computer 22 may be set up so that the computer 22 transmits output to the user interface 70, or to one or more other user interfaces, not shown, upon receiving a request from the user interface 70.

Figure 2:
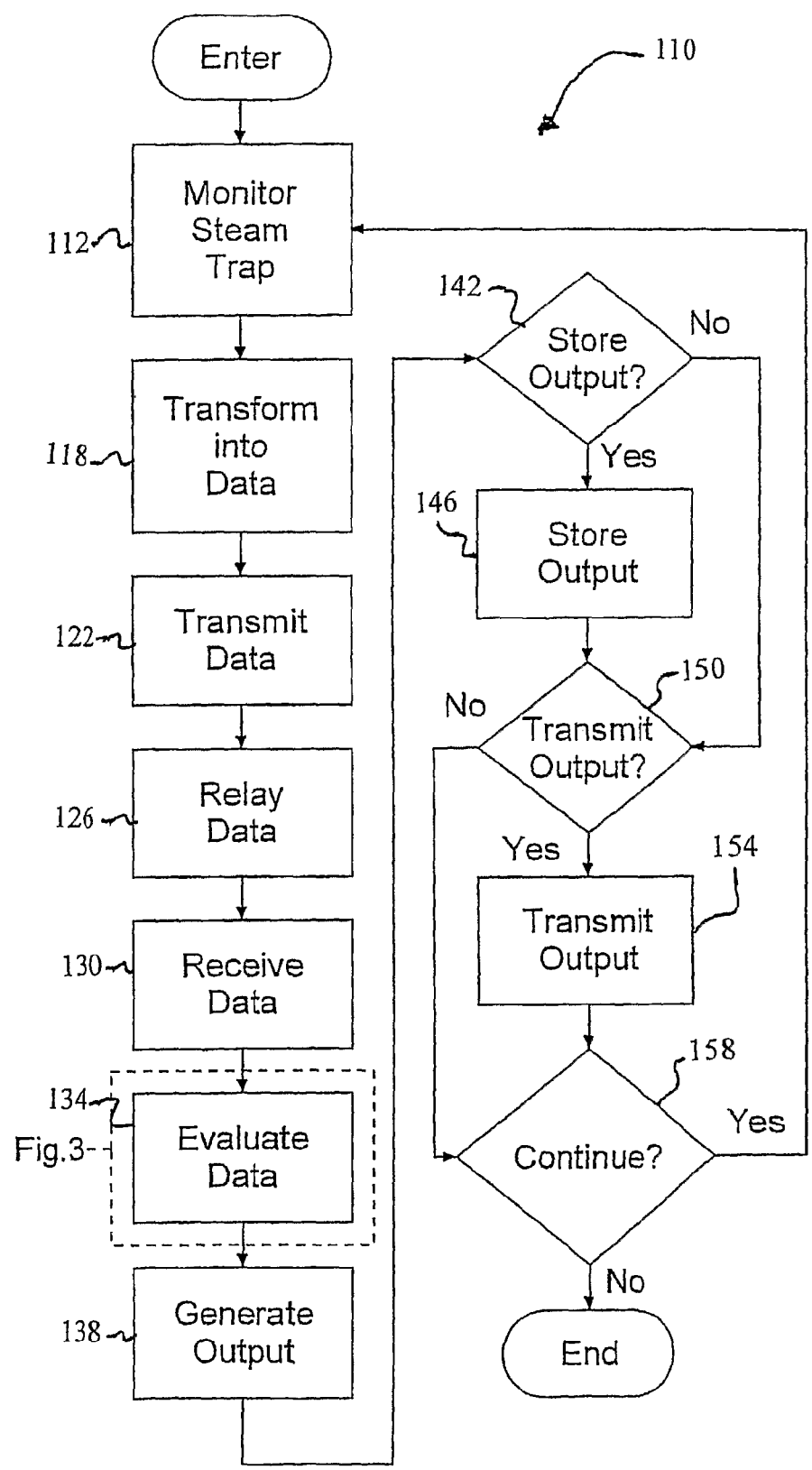
FIG. 2 is a flow chart of a method of analyzing steam trap data using the system of FIG. 1.

There is illustrated in FIG. 2 a method, indicated generally at 110, of analyzing steam trap data. The method 110 may use the system 10 of FIG. 1, or any other suitable system. The method 110 begins in functional block 112 where a parameter of a steam trap is monitored. For example, the parameter, such at the temperature of the steam trap, may be monitored by the steam trap monitoring device 18 of the system 10, or by any other suitable sensor or device.

The method 110 proceeds to functional block 118 where the parameter is transformed into data. For example, the parameter may be transformed into data by the steam trap monitoring device 18, or by a microprocessor, or by any other suitable device.

The method 110 proceeds to functional block 122 where the data is transmitted. For example, the data may be transmitted by the steam trap monitoring device 18, any suitable transmitter, or any suitable device.

The method 110 proceeds to functional block 126 where the data is relayed, i.e., received and transmitted. For example, the data may be relayed by the repeater 38, by the wireless repeater 46, by any suitable transceiver, such as any internet node, by any suitable internet enabled device, or by any other suitable device. It is to be understood that the relaying or repeating of the data transmission of not always necessary.

The method 110 proceeds to functional block 130 where the data is received. For example, the data may be received by the computer 22, or by any suitable device for receiving and evaluating the data.

The method 110 proceeds to functional block 134 where the data is evaluated. For example, the data may be evaluated by the computer 22, or by any suitable device.

The method 110 proceeds to functional block 138 where output is generated based at least in part upon the data from the steam trap. For example, the output may be generated by the computer 22 employing an algorithm for evaluating the data, or the output may be generated by any suitable device in any suitable manner.

The method 110 proceeds to decision block 142 where it is determined if the output is to be stored. For example, this determination may be made by preprogramming the computer 22, or by the computer's receiving direction from the user interface 70, or in any suitable manner.

If the output is to be stored, then the method 110 proceeds to functional block 146 where the data is stored. For example, the computer 22 may send the data to the storage device 50 for storage, or the data may be stored in any suitable manner by any suitable device. Then the method 110 proceeds to decision block 150. If the output is not to be stored, then the method 110 proceeds directly to decision block 150.

In decision block 150 it is determined if the output is to be transmitted. For example, this determination may be made by preprogramming the computer 22, or by the computer's receiving direction from the user interface 70, or in any other suitable manner.

If the output is to be transmitted, then the method 110 proceeds to functional block 154 where the output is transmitted. For example, the output may be transmitted to the user interface 70, or to any other suitable device. It must be understood that the output may be transmitted directly upon completion of the data evaluation or that if the output is stored, the output may be retrieved and transmitted at a later time. Then the method 110 proceeds to decision block 158. If the output is not to be transmitted, then the method 110 proceeds directly to decision block 158.

In decision block 158 it is determined if the method 110 is to continue. For example, this determination may be made by preprogramming the computer 22, or by the computer's receiving direction from the user interface 70, or in any suitable manner. If the method 110 is to continue, the method returns to functional block 112 and continues through as before. Otherwise, the method 110 ends.

Figure 3:
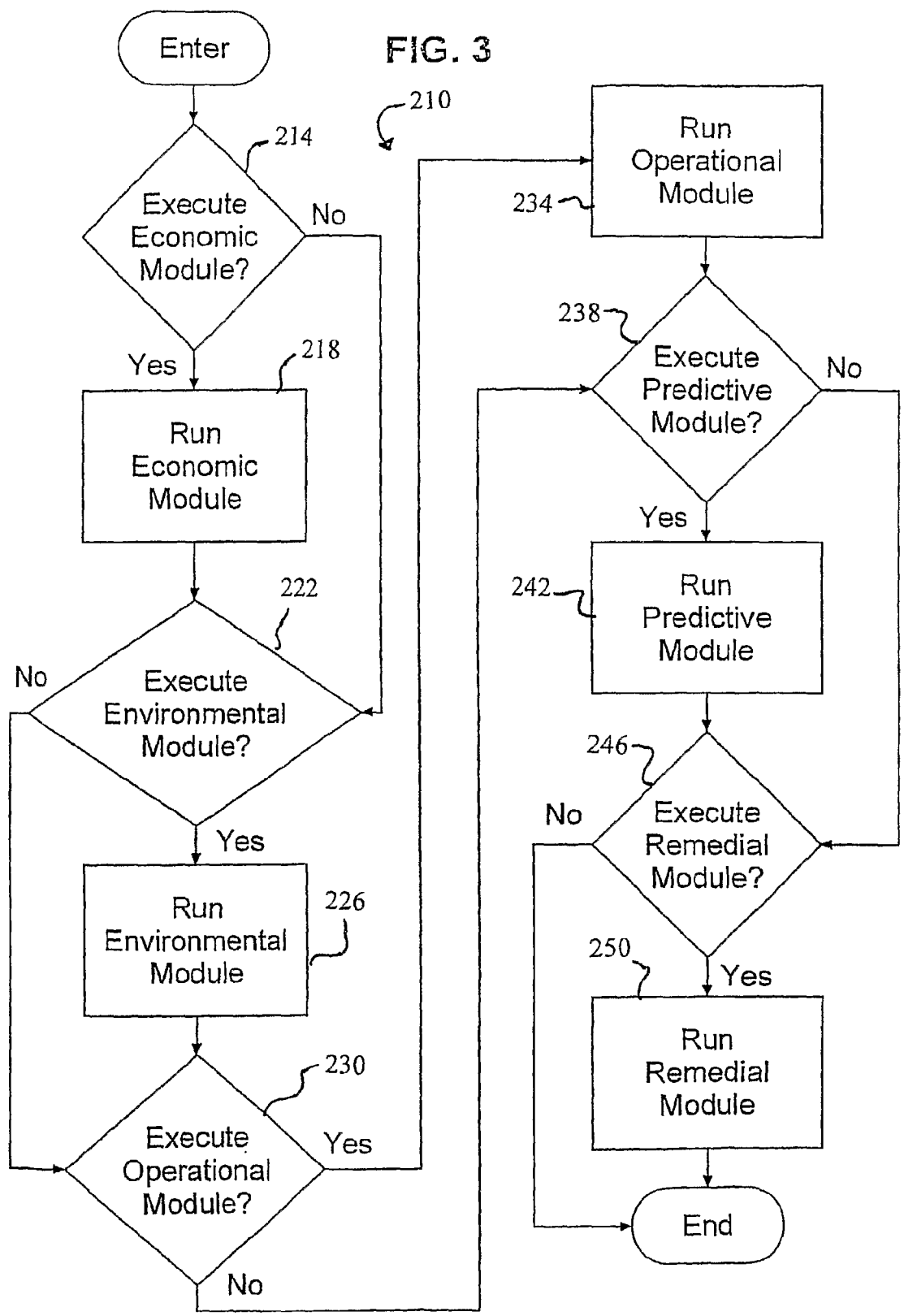
FIG. 3 is an expanded flow chart of a portion of the method of FIG. 2.

There is illustrated in FIG. 3 an expanded portion of the method 110 of FIG. 2, indicated generally at 210. The portion 210 is an expansion of the functional block 134 and the step of evaluating the data. In one embodiment of the present invention, the evaluation of the data is performed by an algorithm including a plurality of program modules. A program module may be executed automatically, for example by preprogramming the computer 22, or a program module may be executed at the direction of a user, for example by sending instruction via the user interface 70, or a program module may be executed in any suitable manner.

The portion 210 begins in decision block 214 where is it determined if an economic module is to be executed. If the economic module is to be executed the portion 210 proceeds to functional block 218 where the economic module is run. Then the portion 210 proceeds to decision block 222. If the economic module is not to be executed then the portion 210 proceeds directly to decision block 222.

For example, the economic module may use cost tables to generate cost reports based upon the current condition of steam trap operations. This information may then be used to generate a cost/benefit analysis of repairing ongoing problems. An example of such an analysis is a report indicating the exact cost in steam loss and energy cost incurred each day as a result of a malfunctioning steam trap.

In decision block 222 it is determined if an environmental module is to be executed. If the environmental module is to be executed the portion 210 proceeds to functional block 226 where the environmental module is run. Then the portion 210 proceeds to decision block 230. If the environmental module is not to be executed then the portion 210 proceeds directly to decision block 230.

For example, the environmental module may use information in efficiency tables, along with known emission values, to formulate environmental impact reports based upon the monitoring of the steam traps. The reports, for example, may include calculated values for $CO_2$, $SOX$, or $NOX$ emissions.

In decision block 230 it determined if an operational module is to be executed. If the operational module is to be executed the portion 210 proceeds to functional block 234 where the operational module is run. Then the portion 210 proceeds to decision block 238. If the operational module is not to be executed then the portion 210 proceeds directly to decision block 238.

For example, the operational module may use contact information in data tables, correlated to personnel to be contacted upon occurrence of certain events, to generate notification reports to specific persons under specific situations, such as to notify a manager of potential steam trap outages. Also, the operational module may use a set of preselected fields to create condition reports that indicate the present operating condition of the steam traps. These reports may then be sent to appropriate personnel for immediate use, or sent to storage to create a record of steam trap operation.

In decision block 238 it determined if a predictive module is to be executed. If the predictive module is to be executed the portion 210 proceeds to functional block 242 where the predictive module is run. Then the portion 210 proceeds to decision block 246. If the predictive module is not to be executed then the portion 210 proceeds directly to decision block 246.

For example, the predictive module may use steam trap history information, model specific information, or location information to generate reports of potential problems. This information may then be used to increase inspection or maintenance of particular steam traps, or to proactively replace steam traps as predicted to fail within a predetermined future time period.

In decision block 246 it determined if a remedial module is to be executed. If the remedial module is to be executed the portion 210 proceeds to functional block 250 where the remedial module is run. Then the portion 210 ends. If the remedial module is not to be executed then the portion 210 ends directly.

For example, the remedial module may use cost tables to calculate the cost of on going steam trap failures, and/or maintenance schedules to generate a repair schedule or create work orders for maintenance to repair particular steam traps. This information may be further integrated with maps of steam trap locations or steam trap model information for repair, or for the generation of supply orders for needed parts.

While the method 110 has been described as using a steam trap monitoring device to monitor a parameter of a steam trap, to transform the parameter into data, and to transmit the data, it must be understood, that the steam trap monitoring device may be any suitable device or any suitable group of modules, such as a separate sensor, microprocessor, and transmitter.

While the principle and mode of operation of this invention have been explained and illustrated with regard to particular embodiments, it must be understood, however, that this invention may be practiced otherwise than as specifically explained and illustrated without departing from its spirit or scope.

What is claimed is:

1. A system for analyzing steam trap data comprising:
   a plurality of steam trap monitoring devices each connected to a respective one of a plurality of steam traps, each of the steam trap monitoring devices including at least one sensor operable to monitor a parameter of the respective steam trap, a transforming apparatus operable to transform the parameter into data, and a transmitter operable to transmit the data to a computer; and
   a computer operable to receive the data, the computer including an algorithm for evaluating the data, the algorithm including an environmental program module for making 1) an efficiency analysis of a steam trap system and 2) an emissions analysis based on steam and emitted constituents other than steam caused by the current operation of the steam trap from the data, the computer generating an output based upon the algorithm, the output being one of output data stored in a data storage device and output data transmitted to a user interface.

2. A system for analyzing steam trap data comprising:
   a plurality of steam trap monitoring devices each connected to a respective one of a plurality of steam traps, each of the steam trap monitoring devices including at least one sensor operable to monitor a parameter of the respective steam trap, a transforming apparatus operable to transform the parameter into data, and a transmitter operable to transmit the data to a computer; and
   a computer operable to receive the data, the computer including an algorithm for evaluating the data, the algorithm including an operational program module for making an analysis of the data, the computer generating an output based upon the algorithm, the output being a present operating condition report, the condition report having a priority of one of immediate use by personnel or one of output data stored in a data storage device, the output sending a notification to specific personnel based on the condition report.

3. The system of claim 2 wherein the algorithm includes an economic program module.

4. The system of claim 2 wherein the algorithm includes a predictive program module.

5. The system of claim 2 wherein the steam trap monitoring device includes an internet enabled transmitter for transmitting the data to the computer.

6. The system of claim 2 wherein the computer is operable to transmit output to an output device, the output being based upon the algorithm evaluation of the data.

7. The system of claim 2 wherein the computer is operable to transmit output to a user interface device.

8. The system of claim 2 wherein the algorithm is automatically executed to evaluate the data upon the computer's receiving the data.

9. The system of claim 2 wherein the algorithm includes a program module operable to be executed upon the computer receiving an execution request from a user interface.

10. The system of claim 2 wherein the computer includes a storage device and is operable to store output to the storage device, the output being based upon the algorithm evaluation of the data.

11. The system of claim 10 wherein the computer is operable to retrieve the stored output from the storage device and operable to transmit the retrieved output to a user interface device.

12. A system for analyzing steam trap data comprising:
    a plurality of steam trap monitoring devices each connected to a respective one of a plurality of steam traps, each of the steam trap monitoring devices including at least one sensor operable to monitor a parameter of the respective steam trap, a transforming apparatus operable to transform the parameter into data, and a transmitter operable to transmit the data to a computer; and
    a computer operable to receive the data, the computer including an algorithm for evaluating the data, the algorithm including a remedial program module for making an analysis of the data, the computer generating output based upon the algorithm, the output being one of a repair schedule or a work order for maintenance to repair a particular steam trap and output data stored in a data storage device.

13. A method of analyzing steam trap data comprising the steps of:
    (a) providing a plurality of steam trap monitoring devices each connected to a respective one of a plurality of steam traps, each of the steam trap monitoring devices including at least one sensor operable to monitor a parameter of the respective steam trap, a transforming apparatus operable to transform the parameter into data, and a transmitter operable to transmit data to a computer and providing a computer operable to receive the data, the computer including an algorithm for evaluating the data, the algorithm including an operational program module for making an analysis of the data and generating a condition report indicating a priority of a steam trap present operating condition;
    (b) using the steam trap monitoring device to monitor a parameter of a steam trap, transform the parameter into data, and transmit the data to the computer; and
    (c) using the computer to receive the data, and evaluate the data with the operational assessment program module of the algorithm; and
    (d) generating a condition report indicating the present operating condition of the steam trap, and using the computer to generate an output based upon the condition report, the output comprising sending a notification to specific personnel based on the condition report and storing the condition report in a data storage device.

14. The method of claim 13 wherein the algorithm includes an economic assessment program module and wherein step (c) further includes generating a cost/benefit analysis of repairing the steam trap.

15. The method of claim 13 wherein the algorithm includes an environmental assessment program module.

16. The method of claim 13 wherein the algorithm includes an remedial assessment program and wherein step (c) further includes generating a repair schedule for maintenance of the steam trap.

17. The method of claim 13 wherein the algorithm includes a predictive assessment program module, the predictive assessment program module using steam tray history information and wherein step (c) further includes generating a potential problem report.

18. The method of claim 13 wherein step (b) further comprises using a repeater to relay the data from the steam trap monitoring device to the computer.

19. The method of claim 18 wherein the repeater is a transceiver operable to relay the data from the steam trap monitoring device to the computer.

20. The method of claim 19 wherein the transceiver is an internet enabled transceiver.

21. A system for analyzing steam trap data comprising:
a plurality of steam trap monitoring devices each connected to a respective one of a plurality of steam traps, each of the steam trap monitoring devices including at least one sensor operable to monitor a parameter of the respective steam trap, a transforming apparatus operable to transform the parameter into data, and a transmitter operable to transmit the data to a computer; and
a computer operable to receive the data, the computer including an algorithm for evaluating the data, the algorithm including an operational program module for making an analysis of the data, the operational program module configured to rank an operating condition of the steam trap and generate an output based on the steam trap operating condition ranking, the output including a notification of the steam trap operating condition sent to specific personnel based on the operating condition ranking.

22. The system of claim 21 wherein the output is a condition report indicating the present operating condition of the steam trap, the condition report generated by the computer indicating the data priority ranking as being one of a high priority for immediate use by personnel or a low priority where the data is stored in a data storage device.

23. The system of claim 22 wherein the algorithm includes an economic module configured to output a repair cost based on the current condition of the steam trap.

24. The system of claim 23 wherein the economic module is configured to generate a cost/benefit analysis of repairing the steam trap based on the data of the steam trap condition.

25. The system of claim 22 wherein the algorithm includes an environmental module configured to assess an environmental impact of the steam trap condition, the environmental impact being a function of at least one of efficiency and emission of the steam trap.

26. The system of claim 25 wherein the environmental module is configured to generate an impact report based upon the steam trap condition, the report comparing known emission values to the data of the steam trap condition, the data including at least one of $CO_2$, $SO_X$, and $NO_X$ emissions.

27. The system of claim 22 wherein the algorithm includes a predictive module configured to evaluate potential steam trap problems based on the data of the steam trap condition.

28. The system of claim 27 wherein the predictive module is configured to access information of at least one of steam trap performance history, model specific specifications, and steam trap location to generate an output based on the evaluation of potential steam trap problems.

29. The system of claim 22 wherein the operational program module is configured to rank the data according to priority of the steam trap condition based on output of at least one of an economic module output of a cost/benefit analysis of repairing the steam trap, an environmental module output of an assessment of an environmental impact of the steam trap condition, and a predictive module output of an evaluation of potential steam trap problems.

30. The system of claim 29 wherein the output of the operational module is a notification of the steam trap condition associated with the high priority ranked data.

* * * * *